April 15, 1930.　　　L. G. WEYLANDT　　　1,754,380
CRANK SHAFT AND CONNECTING ROD FOR INTERNAL EXPANSION ENGINES
Filed April 15, 1927
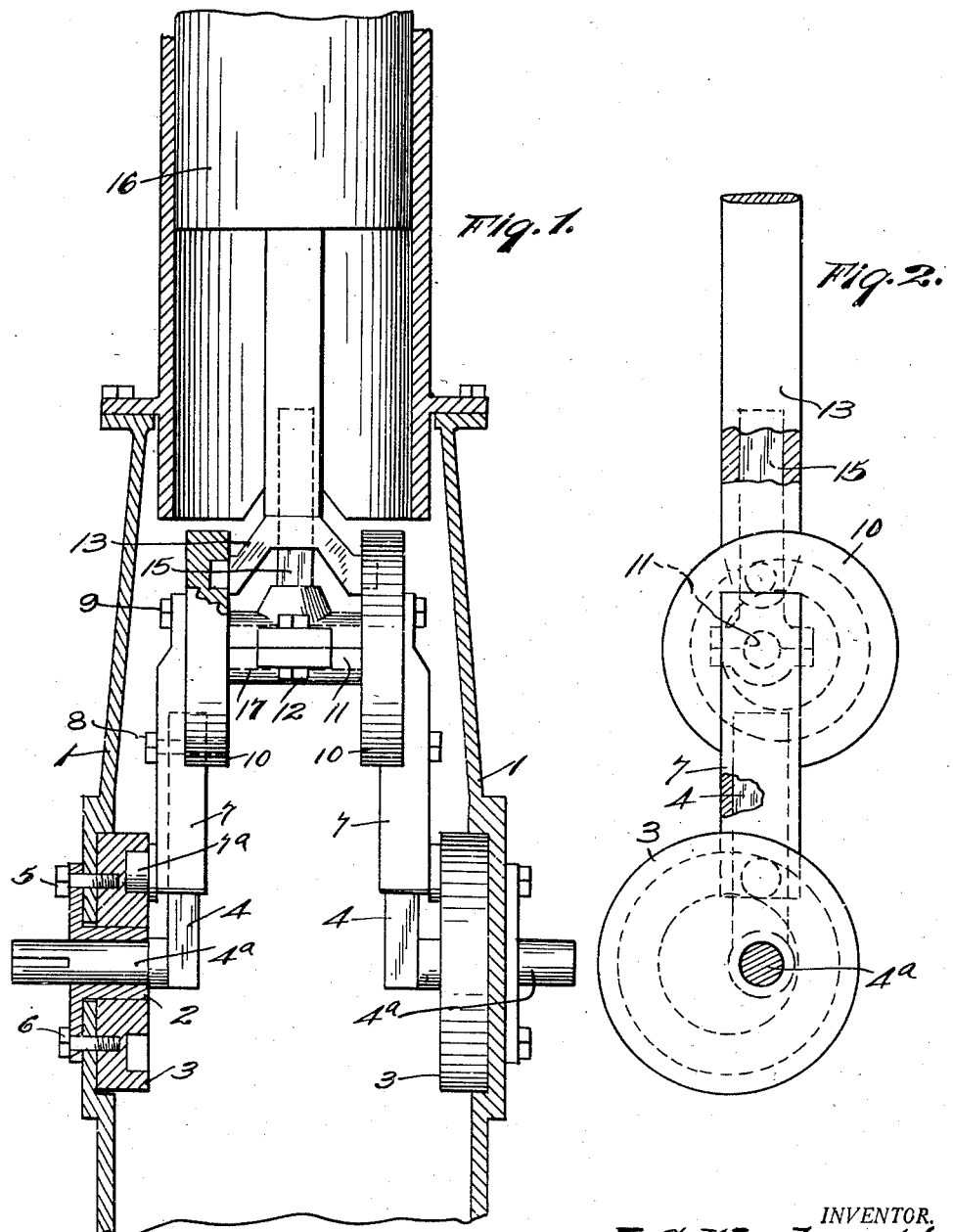

Patented Apr. 15, 1930

1,754,380

UNITED STATES PATENT OFFICE

LAWRENCE GLEN WEYLANDT, OF CALEXICO, CALIFORNIA

CRANK SHAFT AND CONNECTING ROD FOR INTERNAL-EXPANSION ENGINES

Application filed April 15, 1927. Serial No. 184,123.

My invention relates to reciprocating engines and more particularly to the crank and link connections thereof.

An object of the invention is to provide means for automatically differentiating the length of crank leverage on the power stroke and on the return stroke without increasing the length of stroke of the piston, and to so construct, combine and time the mechanism that the maximum leverage will be effective during the power stroke with minimum on the return stroke.

There are other objects, advantages and features of construction and organization, and details of elements, as will be made manifest in the ensuing description; it being understood that modifications, variations and adaptations may be resorted to within the spirit, scope and principle of the invention as it is more directly claimed hereinafter.

Figure 1 is an axial section of the engine; the piston being in outer position.

Figure 2 is a side elevation of the crank and link train; looking toward an end of the shaft.

The mechanism consists of a pair of right and left cranks 4 with coaxial shafts 4ª turning in bearings 2 mounted in the end plates of a crank case 1.

Affixed to the inside of the case is a set of coaxial discs 3 which are set eccentric to the shafts 4ª in an arc about 90° from the axial plane of the cylinder and shaft. The discs 3 are fastened down by bolts 5 and 6 and their inner faces have circular grooves forming guideways for runners 7ª of sliding arms 7 which reciprocate on respective crank parts 4. These arms constitute means for gradually increasing the crank leverage on power stroke and then gradually decreasing it on return stroke.

In order to control the stroke of the operative piston and accomplish the variable crank leverage desired without unduly increasing the stroke of the piston the sliding arm 7 of the cranks 4 are provided with coaxial discs 10 set eccentric in a position diagonal to the eccentric discs 3.

The opposed faces of the discs 10, which are secured to their arms by bolts 8—9, are provided with circular guideways in which travel runners on the lower or inner end of the master link 13 attached to the piston 16.

When the crank arms 7 are driven outward by the eccentric cams 3 the eccentric cams 10 so act on the link 13 as to relatively shift the connecting point from the extremity of the arms 7, (Fig. 2) inward toward the cranks 4 thereby effecting an increase of crank leverage without excessive piston stroke.

The center of oscillation of the link 13 as to the control cams 10 is on a cross crank-pin 17 fixed to the spaced cams 10 and being on the radial plane of the crank arms. The link 13 is kept on this center 17 by means of a sliding section 15 telescoping in the inner end of the drive part 13. The section 15 has a bearing 11 secured by suitable means, as bolts 12.

The invention claimed is:

1. In a reciprocating engine, a piston, a crank shaft, variable length crank arms on the shaft, cam means for varying the arm length and variable motion link means connecting the piston and the crank arms and comprising a telescopic connecting rod attached to the piston and a motion-differentiating device connecting the said rod to the crank arms.

2. In a reciprocating engine, a piston, a crank shaft having variable length crank arms, variable length links attached to the piston, and length-varying means connected to the arms for driving and actuating the variable links.

3. In a reciprocating engine, a piston, sectional crank arms turning on fixed centers, a telescopic link device attached to the piston, eccentric means fixed to the outer end of the crank arms to control link stroke, and fixed, eccentric means to vary the throw of the outer sections of the cranks.

4. In a reciprocating engine, a piston, telescopic crank arms turning on fixed centers, a link device attached to the piston, means connecting said link device and the arms and including an eccentric regulating device fixed to the relative arm sections, and means for increasing the effective length of the arms.

5. In a reciprocating engine, a piston, a shaft having crank arms with reciprocative outer sections, a cross-pin mounted in and connecting said sections, means for reciprocating said sections during the cycle of the arms, a drive link attached to the piston, and means connecting said link and said sections to control the piston stroke.

6. In a reciprocating engine, a piston, a shaft having crank arms with reciprocative end sections and a crank-pin connecting the same, cams eccentric to the shaft and means operative thereon to vary the throw of the pin, a variable length link attached to the piston and to said pin, and eccentric track means on said sections operative to vary the effective length of the link during cycle of the crank arms.

LAWRENCE GLEN WEYLANDT.